Aug. 14, 1934.  W. O. BROWN  1,970,274
CITRUS FRUIT REAMER
Filed Nov. 6, 1930
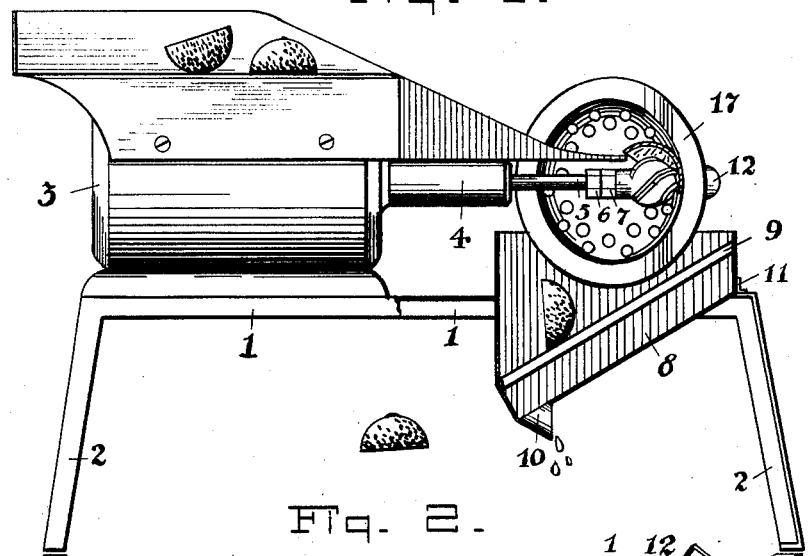
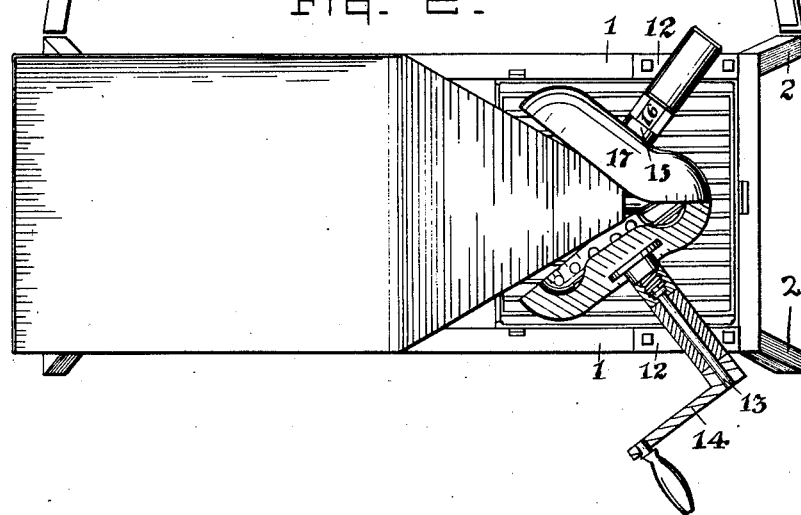
William Oliver Brown, INVENTOR.

Patented Aug. 14, 1934

1,970,274

UNITED STATES PATENT OFFICE 1,970,274

CITRUS FRUIT REAMER

William Oliver Brown, West Hollywood, Calif.

Application November 6, 1930, Serial No. 493,794

6 Claims. (Cl. 146—3)

The invention relates to improvements in citrus fruit reaming machines in which manually rotated rubber tractors operate in conjunction with a motor driven reamer, and the objects of the improvement are, first, to provide a citrus fruit reaming machine that will mechanically hold the fruit to the reamer, while the juice and pulp is being burred out, second, to furnish a means of separating the juice from the peel without the juice contacting the hands of the operator, third, to avoid the labor of holding the fruit to the reamer while the juice is being taken and fourth to increase the speed of taking the juice.

One form of the invention is illustrated in the accompanying drawing, in which Figure 1 is a partly sectional side view of the machine and Fig. 2 a plan view of the machine with a sectional view of one of the tractors.

The frame 1, its legs or standards 2 2, shown as made of angle iron with welded joints constitutes the frame work of the machine. The motor 3 with extended housing or bearing 4 is fixedly mounted on the frame with the extended armature shaft 5 extending through and projecting from the fixedly mounted housing then threaded through lock nut 6 and also threaded into reamer 7, which provides an adjustment of the reamer in its relation to the rubber tractors.

The juice box 8 with the grid like screen 9 mounted therein is supported on the frame by the lugs 11 11 and has a discharge pipe 10 at the bottom.

The juice collecting box has the inner end open above the screen through which the peel is discharged.

The post bearings 12 12, supports the tractor shafts, one of which is shown at 13 Fig. 2 having the operating crank 14 fixedly mounted on its outer end and having a head on the inner end with a tongue thereon adapted to engage a slot in the tractor hub 15 to which is threaded nut 16 which locks the tractor hub rigidly to the shaft 13.

The opposite or idle tractor is driven by the frictional contact of the two tractors at the contact point of their rims.

The tractors 17 17 are preferably made of pure gum rubber for flexibility and are moulded fixedly to tractor hubs 15 15. They are also cupped out on their inner sides as shown in Figure 2 so that when pressed together at their contact points the inner walls will form an elongated pocket for the reamer to operate in, as the tractors are rotated the pocket will remain stationary but the inner walls of the pocket will travel past the reamer in the direction of rotation of the tractors.

The inner walls of the tractors have vacuum cup like cavities moulded on the portion that contacts the fruit to assist the tractors in frictionally gripping the fruit in passing it over the reamer.

The reamer is rotated at high speed by the motor and the halves of fruit are fed into the tractors over the reamer with one hand by the operator while the tractors may be rotated by means of the crank with the other hand.

The reamer has spirally formed ridges thereon which serves to beat out the juice and pulp while the thread travel of the spiral ridges assists the tractors in feeding the fruit through.

A table mounted on the motor and having two raised sides with a ramp leading down to the reamer with a portion near the extended end of the ramp or slide curved so that the portion of said ramp at its terminus or delivery end extends parallel with the axis of the reamer shaft, and in such relation to the reamer as to deliver the fruit into contact with the side of the reamer, and into contact with the inner rotatable and continuous moving walls of the pocket formed over and in spaced relation to the end of the reamer by the annular grooves in the inner opposing faces of the rotatably mounted tractors is for convenience in holding the halved fruit and feeding it to the reamer.

The fruit in passing over the reamer end will pass through in such a path and manner as to cause the reamer end to follow the contour of the inner wall of the peel from the leading cut edge of the moving peel to the rear cut edge of the same, in a curved line which bisects the half peel in a vertical plane, beating out the juice and pulp which is thrown downward through the screen and is collected by the box 8 and discharged through the opening 10.

The peel is stopped by the screen and tumbles down the incline and out the open inner end of box 8.

I am aware that prior to my invention citrus fruit reaming machines have been made having juice collecting receptacles. I therefore do not claim such a combination broadly; but I claim:

1. A fruit juice extractor comprising two flexible bowl shaped members, each of the said members having an annular groove in the inner face thereof, said members being mounted in angular facing relation for rotation on axes, a portion of the edges of the members contacting and the corresponding grooves forming a pocket, a rotatably mounted reamer operating in said pocket, means for feeding fruit to one side of the reamer, and means for rotating the said reamer and the said members.

2. A fruit juice extractor comprising a rotatably mounted reamer, oppositely disposed flexible bowl shaped members positioned on each side of said reamer, each of said members having an annular groove in the inner face thereof, said bowl shaped members being mounted in angular facing relation for rotation on axes, a portion of the edges of the members contacting and the corresponding grooves forming a yieldable pocket having continuous moving walls that pass the sides and end of the reamer in the same direction and in spaced relation thereto, when said members are rotated, and means for rotating the reamer and members substantially as described.

3. A fruit juice extractor comprising a rotatably mounted reamer shaft, a reamer fixed to one end of said shaft, a fruit support or slide positioned above said reamer shaft with the delivery end of the said support or slide parallel with the axis of the said reamer shaft, oppositely disposed flexible bowl shaped members mounted in angular facing relation for rotation on axes, a portion of the edges of the members contacting and the corresponding grooves forming a pocket which partially encloses said reamer, both walls of said pocket being adapted to travel past the sides and end of the said reamer in the same direction and in an arc of a circle the axis of which is at right angles to the axis of the said reamer, and in normally spaced relation to said reamer, and means for rotating said reamer and said members, substantially as described.

4. A fruit juice extractor comprising two flexible bowl shaped members, each of said bowl shaped members having an annular groove in the inner face thereof, said members being mounted in angular facing relation for rotation on axes, a portion of the edges of the members contacting and the corresponding grooves forming a pocket, a reamer shaft housing, a reamer shaft rotatably mounted in said housing, a reamer fixed to one end of the said reamer shaft and operative in said pocket, the top of said reamer shaft housing being so formed as to provide a ramp or slide having its delivery end positioned in parallel relation with the axis of the said reamer shaft to provide means for feeding fruit into contact with one side of the said reamer and into contact with the rotatable walls of the said pocket, and means for rotating the reamer and members.

5. A fruit juice extractor comprising two flexible bowl shaped members, each of the said bowl shaped members having an annular groove in the inner face thereof, said members being mounted in angular facing relation for rotation on axes, a portion of the edges of the members contacting and the corresponding grooves forming a pocket, a juice extracting means for operating in the said pocket, a means for rotating the said bowl shaped members and operating the said juice extracting means.

6. A fruit juice extractor comprising a rotatably mounted reamer, oppositely disposed flexible members positioned on each side of the said reamer, each of the said members having a groove in the inner face thereof, with the corresponding grooves forming an elongated pocket having moving walls for the reamer to operate in, a means for rotating the said reamer and for moving the walls of the said pocket.

WILLIAM OLIVER BROWN.